No. 877,551. PATENTED JAN. 28, 1908.
E. M. COOK.
AUTOMATIC SPRINKLER HEAD.
APPLICATION FILED APR. 9, 1907.
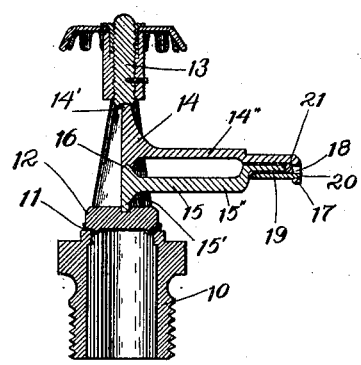
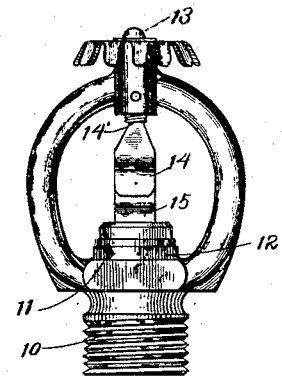
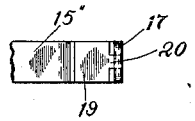
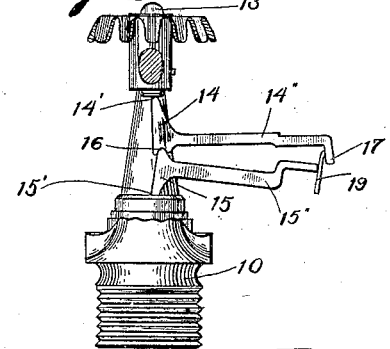
Witnesses
Karl Clendening,
Thomas W. McMeans
Inventor,
Emanuel M. Cook,
By
Bradford & Hood,
Attorneys.

UNITED STATES PATENT OFFICE.

EMANUEL M. COOK, OF INDIANAPOLIS, INDIANA.

AUTOMATIC SPRINKLER-HEAD.

No. 877,551.

Specification of Letters Patent.

Patented Jan. 28, 1908.

Application filed April 9, 1907. Serial No. 367,280.

*To all whom it may concern:*

Be it known that I, EMANUEL M. COOK, a citizen of the United States, residing at Indianapolis, in the county of Marion and State of Indiana, have invented certain new and useful Improvements in Automatic Sprinkler-Heads, of which the following is a specification.

The object of my invention is to produce an improved means for holding valves in automatic sprinkler heads.

The accompanying drawings illustrate my invention.

Figure 1 is a central vertical section of an embodiment of my invention; Fig. 2 is an elevation thereof; Fig. 3 a detail plan of the adjacent ends of the levers, and Fig. 4 an elevation showing the position assumed by the parts immediately after the fusing of the fusible solder.

In the accompanying drawings 10 indicates an ordinary sprinkler head provided with a valve seat 11, valve 12 and the adjustable abutment 13. In order to hold the valve 12 to its seat I provide a pair of L-shaped levers 14 and 15 which are so formed at their heels 16 as to form a toggle joint offset slightly to one side from a line connecting their tips 14' and 15' respectively. The long arm 14'' of lever 14 is provided with a downturned lip 17 having a perforation 18, and long arm 15'' of lever 15 is somewhat shorter than the arm 14'' in order that it may lie in front of the lip 17. In order to hold the long arms of the levers together I provide a thin plate 19 having a short finger 20 adapted to enter the opening 18.

In assembling the parts the tip of the long arm 15'' of lever 15, the lower face of arm 14'' adjacent lip 17, and one face of plate 19 are coated with a solder 21 having the desired fusing temperature. The levers are placed together, as shown in Fig. 1, with plate 19 beneath the tip of arm 15'' and with its finger 20 in opening 18, and when in this relation the solder is fused and cooled so as to hold the parts together. Valve 12 is then placed in position and the composite lever secured in place by screwing pin 13 down hard upon the toe of lever 14, thus placing the solder 21 under tension, the strength of the solder being supplemented by the finger 20 of plate 19, the arrangement being such that very considerable pressure may be exerted normally on the toes of the levers.

As soon as the temperature rises enough to soften the solder it is ruptured and the levers swing outwardly on their heels, plate 19 dropping so as to quickly fire the levers, and valve 12 is blown from its seat by the water. It is not necessary that the solder should be between the two levers, as the plate 19 is sufficient to hold the levers together, but, in the ordinary assembling of the parts the solder will creep between the levers and it will do no harm in that location.

I claim as my invention:

1. A holding member for valves of automatic sprinkler heads, comprising a pair of L-shaped levers pivoted at their heels and having engaging portions at the ends of their long arms, a perforated downturned lip on the long arm of one of said levers, an independent member having a portion adapted to enter the perforation in said downturned lip and another portion lying alongside the long arm of the other of said levers, and an easily fusible solder cementing the adjacent engaging portions of the arms and the independent member together.

2. The combination, with a sprinkler head and its valve, of a pair of L-shaped levers having a toggle interengagement at their heels and having engaging portions at the ends of their long arms, a downturned lip on the long arm of one of said levers, an independent member having a portion adapted to engage said lip and another portion lying alongside the long arm of the other of said levers, and an easily fusible solder cementing the adjacent engaging portions of the arms and the independent member together, and an abutment carried by the sprinkler head for engagement by the short arm of one lever, the short arm of the other lever engaging the valve.

In witness whereof, I have hereunto set my hand and seal at Indianapolis, Indiana, this fifth day of April, A. D. one thousand nine hundred and seven.

EMANUEL M. COOK. [L. S.]

Witnesses:
ARTHUR M. HOOD,
THOMAS W. McMEANS.